(12) United States Patent
Chiu

(10) Patent No.: US 7,945,767 B2
(45) Date of Patent: May 17, 2011

(54) RECOVERY APPARATUS FOR SOLVING BRANCH MIS-PREDICTION AND METHOD AND CENTRAL PROCESSING UNIT THEREOF

(75) Inventor: Chih-Yung Chiu, Hsinchu County (TW)

(73) Assignee: Faraday Technology Corp., Hsin-Chu (TW)

( * ) Notice: Subject to any disclaimer, the term of this patent is extended or adjusted under 35 U.S.C. 154(b) by 449 days.

(21) Appl. No.: 12/241,391

(22) Filed: Sep. 30, 2008

(65) Prior Publication Data
US 2010/0082953 A1  Apr. 1, 2010

(51) Int. Cl.
G06F 9/48 (2006.01)
G06F 9/445 (2006.01)
(52) U.S. Cl. .......................... 712/239; 712/233
(58) Field of Classification Search .................. None
See application file for complete search history.

(56) References Cited

U.S. PATENT DOCUMENTS

| | | | | |
|---|---|---|---|---|
| 6,115,807 | A * | 9/2000 | Grochowski | 712/212 |
| 6,609,191 | B1 * | 8/2003 | Hooker et al. | 712/216 |
| 6,912,648 | B2 * | 6/2005 | Hammarlund et al. | 712/219 |
| 6,981,129 | B1 * | 12/2005 | Boggs et al. | 712/218 |
| 2004/0034762 | A1 * | 2/2004 | Kacevas | 712/239 |
| 2005/0050309 | A1 * | 3/2005 | Yamashita et al. | 712/239 |
| 2005/0120179 | A1 * | 6/2005 | Akkary et al. | 711/126 |
| 2007/0028078 | A1 * | 2/2007 | Harris et al. | 712/214 |

OTHER PUBLICATIONS

Chuang, W. etal., Predicate Prediction for Efficient for Out-of-order Execution, 2003, ACM pp. 183-192.*
Zhou, P., etal., Fast Branch Misprediction Recovery in Out-of-order Superscalar Processors, 2005, ACM, pp. 41-50.*
Quinones, E., etal., Selective Predicate Prediction for Out-of-order Processors, 2006, ACM, pp. 46-54.*

* cited by examiner

*Primary Examiner* — Eric Coleman
(74) *Attorney, Agent, or Firm* — Winston Hsu; Scott Margo

(57) ABSTRACT

A recovery apparatus for solving a branch mis-prediction, and a method and a central processing unit (CPU) thereof are provided. The recovery apparatus includes an instruction buffer, at least one circular instruction buffer, and a decoding and pairing circuit. The decoding and pairing circuit is coupled to the instruction buffer and the circular instruction buffer. The instruction buffer stores a plurality of instructions, and the circular instruction buffer stores a recovery instruction queue corresponding to the instructions, wherein the recovery instruction queue includes a plurality of recovery instructions. The decoding and pairing circuit decodes and pairs the instructions and the recovery instructions. When the branch mis-prediction occurs, the decoding and pairing circuit outputs the recovery instructions to an instruction execution and processing circuit which is externally connected to the decoding and pairing circuit.

14 Claims, 2 Drawing Sheets

RECOVERY APPARATUS FOR SOLVING BRANCH MIS-PREDICTION AND METHOD AND CENTRAL PROCESSING UNIT THEREOF

BACKGROUND OF THE INVENTION

1. Field of the Invention

The present invention generally relates to a branch predication apparatus for a central processing unit (CPU), and more particularly, to a recovery apparatus for solving a branch mis-predication and a method and a CPU thereof.

2. Description of Related Art

Along with the development of semiconductor technology, computer has become one of the most indispensable tools in our daily life, and people can use computers to accomplish many tasks by executing various computer programs. A central processing unit (CPU) is the most important part in a computer. Most of high performance CPUs have a branch prediction apparatus for processing branch instructions.

Generally, there is one branch instruction in every four or five instructions of a program. Thus, the performance of a computer can be improved by using a CPU with a branch prediction apparatus. However, a branch prediction apparatus cannot always predict the next instruction to be executed precisely when the CPU processes a branch instruction. Thus, the branch prediction apparatus may produce a branch mis-predication and which may result in a loss of CPU performance. Such a loss in CPU performance is usually referred as the branch penalty.

In order to resolve foregoing problem, many academic institutions and CPU manufacturers focus on the reduction of the probability of branch mis-predications. Accordingly, many predication algorithms and branch predication architectures are provided.

However, foregoing software algorithms or hardware architectures can only reduce the probability of branch mis-predications, but branch mis-predication always occurs in a conditional branch or the final loop of a loop operation in a program. Thus, a multi-path execution CPU architecture is provided to resolve the problem of branch mis-predication.

However, the multi-path execution CPU can only process one branch mis-predication. Accordingly, a confidence estimator is required to help the multi-path execution CPU to fetch instructions on multiple paths. Besides, the multi-path execution CPU completes the instructions on two paths simultaneously. As a result, a register renaming mechanism is further required for processing data dependency and register commitment.

Presently, the multi-path execution CPU architecture is still in the theoretical stage but not implemented as a commercial hardware due to its high complexity. In addition, the multi-path execution CPU architecture can only increase about 10% of the performance according to the related documents and researches.

Besides using a multi-path execution CPU for processing multi-path executions, a multi-threading CPU which allows a complier to process multi-path executions with two threads is also adopted.

However, the multi-path execution method or architecture cannot be implemented in a deep-pipelining superscalar CPU due to its high complexity. Moreover, in order to improve the performance, a confidence estimator or the effort of a complier is required by foregoing architecture or method to execute multi-path instructions.

SUMMARY OF THE INVENTION

Accordingly, the present invention is directed to a recovery apparatus for solving a branch mis-predication in a conditional branch or the final loop of a loop operation, and a method and a central processing unit (CPU) thereof, wherein the recovery apparatus can effectively reduce performance penalty caused by branch mis-predication. In addition, the recovery apparatus and the method thereof can be especially applied to a deep-pipelining superscalar CPU because of their low complexity.

The present invention provides a recovery apparatus for solving a branch mis-predication. The recovery apparatus includes an instruction buffer, at least one circular instruction buffer, and a decoding and pairing circuit. The decoding and pairing circuit is coupled to the instruction buffer and the circular instruction buffer. The instruction buffer stores a plurality of instructions, and the circular instruction buffer stores a recovery instruction queue corresponding to the instructions, wherein the recovery instruction queue includes a plurality of recovery instructions. The decoding and pairing circuit decodes and pairs the instructions and the recovery instructions. When the branch mis-predication occurs, the decoding and pairing circuit outputs the recovery instructions to an instruction execution and processing circuit connected to the decoding and pairing circuit externally.

According to an embodiment of the present invention, the recovery apparatus further includes a branch target buffer (BTB), a cache controller, and an instruction cache memory circuit. The BTB is coupled to the cache controller, the cache controller is coupled to the instruction cache memory circuit, and the instruction cache memory circuit is coupled to the circular instruction buffer and the instruction buffer. The BTB detects whether a branch prediction occurs. When the branch prediction occurs, the BTB sends a target program counter (target PC) to the cache controller. The cache controller controls the instruction cache memory circuit according to the target PC to fetch the instructions and the recovery instructions stored therein.

The present invention provides a recovery method for solving a branch mis-predication. The recovery method includes: (a) receiving a plurality of instructions into an instruction buffer memory, and receiving a plurality of recovery instructions corresponding to the instructions into at least one circular instruction buffer; (b) encoding and pairing the instructions and the recovery instructions; (c) outputting the recovery instructions to an instruction execution and processing circuit when the branch mis-predication occurs.

According to an embodiment of the present invention, the recovery method further includes: (d) setting a branch mis-predication bit of each of the recovery instructions to be 1, and recording a branch program counter of each of the recovery instructions.

According to an embodiment of the present invention, the recovery method further includes: (e) outputting the instructions to the instruction execution and processing circuit if the branch mis-predication does not occur.

According to an embodiment of the present invention, the number of recovery instructions which can be stored in the circular instruction buffer is equal to the number of instructions which can be executed by the instruction execution and processing circuit.

The present invention provides a CPU having a recovery apparatus. The CPU includes an instruction buffer, at least one circular instruction buffer, a decoding and pairing circuit, and an instruction execution and processing circuit. The decoding and pairing circuit is coupled to the instruction buffer and the circular instruction buffer, and the instruction execution and processing circuit is coupled to the decoding and pairing circuit. The instruction buffer stores a plurality of instructions, and the circular instruction buffer stores a recovery instruction queue corresponding to the instructions, wherein the recovery instruction queue includes a plurality of recovery instructions. The decoding and pairing circuit decodes and pairs the instructions and the recovery instructions. When a branch mis-predication occurs, the decoding and pairing circuit outputs the recovery instructions to the instruction execution and processing circuit. The instruction execution and processing circuit executes the recovery instructions and the instructions.

According to an embodiment of the present invention, the CPU further includes a BTB, a cache controller, and an instruction cache memory circuit. The BTB is coupled to the cache controller, the cache controller is coupled to the instruction cache memory circuit, and the instruction cache memory circuit is coupled to the circular instruction buffer and the instruction buffer. The BTB detects whether a branch prediction occurs. When the branch prediction occurs, the BTB sends a target PC to the cache controller. The cache controller controls the instruction cache memory circuit according to the target PC to fetch the instructions and the recovery instructions stored therein. The instruction cache memory circuit stores the instructions and the recovery instructions.

As described above, the recovery apparatus and the method and the CPU thereof provided by the present invention reduce the performance penalty caused by branch mis-predication. The recovery apparatus provided by the present invention is achieved by simply disposing at least one circular instruction buffer in an original CPU and several logic gates in an original decoding and pairing circuit. Thus, the recovery apparatus in the present invention has low complexity therefore can be easily implemented. Moreover, compared to a CPU without any instruction buffer, the performance of the CPU having the recovery apparatus is increased by about 9%~10% in a same 12-level dual pipeline super-scalar CPU having a cache hit rate and a BTB hit rate at 95%.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
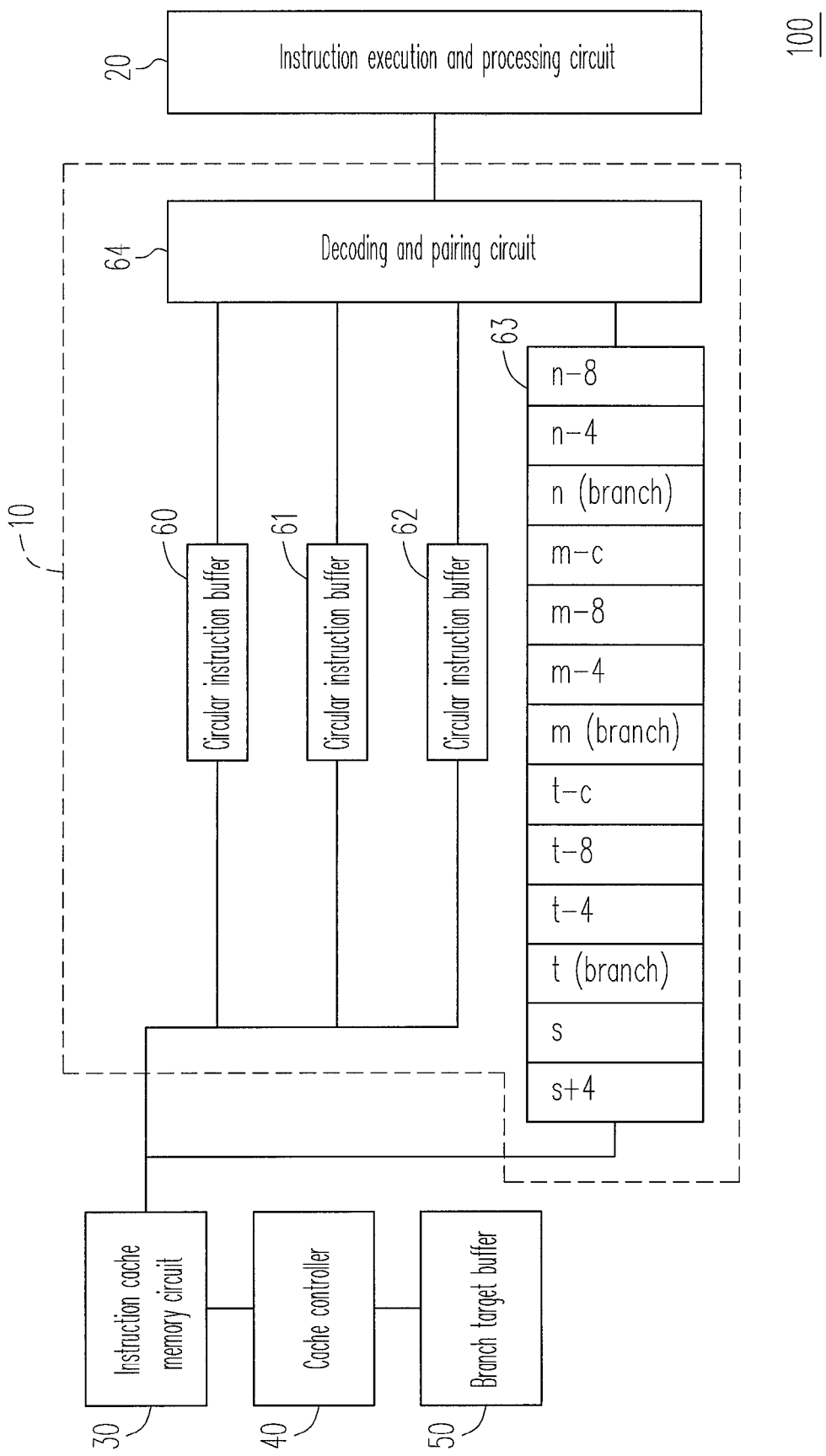
FIG. 1 illustrates a central processing unit (CPU) 100 according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention provides a recovery apparatus for solving a branch mis-predication, and a method and a central processing unit (CPU) thereof. The recovery apparatus can reduce the performance penalty when the branch mis-predication occurs.

As described above, within a program, there is one branch instruction in every four or five instructions, and branch mis-predication always occurs in a conditional branch or a final loop. Thus, the recovery apparatus provided by the present invention allows its back-end instruction execution and processing circuit to execute the corresponding recovery instructions when a branch mis-predication occurs, so that the loss of the overall performance can be reduced.

FIG. 1 illustrates a CPU 100 according to an embodiment of the present invention. Referring to FIG. 1, the CPU 100 includes a recovery apparatus 10, an instruction execution and processing circuit 20, an instruction cache memory circuit 30, a cache controller 40 and a branch target buffer (BTB) 50. The BTB 50 is coupled to the cache controller 40, the cache controller 40 is coupled to the instruction cache memory circuit 30, and the recovery apparatus 10 is coupled between the instruction execution and processing circuit 20 and the instruction cache memory circuit 30.

It should be noted herein that the instruction execution and processing circuit 20 may be a deep-pipelining superscalar instruction execution and processing circuit; however, the type of the instruction execution and processing circuit 20 is not limited in the present invention. In addition, in the present embodiment, the instruction cache memory circuit 30, the cache controller 40, and the BTB 50 are separated from the recovery apparatus 10; however, the present invention is not limited thereto, and in another embodiment of the present invention, the instruction cache memory circuit 30, the cache controller 40, or the BTB 50 may also be disposed within the recovery apparatus 10.

When the BTB 50 detects that a branch instruction occurs and the branch instruction hits the BTB 50, the BTB 50 sends a target program counter (target PC) to the cache controller 40. The cache controller 40 controls the instruction cache memory circuit 30 according to the target PC to fetch a plurality of instructions stored in the instruction cache memory circuit 30 and send the instructions to the recovery apparatus 10.

The recovery apparatus 10 temporarily stores the instructions fetched from the instruction cache memory circuit 30 into a buffer thereof. These instructions may include a plurality of branch instructions for branch prediction, a plurality of general instructions, and a plurality of recovery instructions for branch mis-prediction. Next, the recovery apparatus 10 encodes and pairs the branch instructions for the branch prediction and the recovery instructions or encodes and pairs only the general instructions. When the branch mis-predication does not occur, the recovery apparatus 10 sends the general instructions or the branch instructions for the branch prediction to the back-end instruction execution and processing circuit 20 to be executed. However, if the branch mis-predication occurs, the recovery apparatus 10 sends the recovery instructions to the back-end instruction execution and processing circuit 20 to be executed.

When the branch mis-predication occurs, the instruction execution and processing circuit 20 clears all the instructions in its pipeline. However, herein the recovery apparatus 10 sends the recovery instructions to the instruction execution and processing circuit 20 to be executed. Thus, the recovery apparatus 10 can fetch and temporarily store the instructions to be executed subsequently during this time. Accordingly, the performance penalty caused by stalling the pipeline of the instruction execution and processing circuit 20 and the recovery Apparatus 10 when the branch mis-predication occurs can be effectively reduced.

Thereafter, the structure and implementation of the recovery apparatus 10 will be further described. As shown in FIG. 1, the recovery apparatus 10 includes circular instruction buffers 60~62, an instruction buffer 63, and a decoding and pairing circuit 64. The circular instruction buffers 60~62 are coupled between the decoding and pairing circuit 64 and the instruction cache memory circuit 30, the decoding and pairing circuit 64 is coupled to the instruction execution and processing circuit 20, and the instruction buffer 63 is coupled between the decoding and pairing circuit 64 and the instruction cache memory circuit 30. In the pipeline CPU 100, the decoding and pairing circuit 64 may be integrated into a decode stage at the forepart of the pipeline, and the instruction execution and processing circuit 20 may contain the stage at the after part of the pipeline, such as an instruction execution stage.

It should be noted that even there are three circular instruction buffers 60~62 in the present embodiment, the present invention is not limited thereto. In other words, the number of the circular instruction buffers may be determined according to the actual requirement. In the present embodiment, it is assumed that the instruction buffer 63 can store 12 instructions and there is one branch instruction in every four instructions. Accordingly, the numbers of the circular instruction buffers can be set to 12/4=3. In short, the general rule for determining the number of the circular instruction buffers is $\lceil x/n \rceil$, wherein x represents the number of instructions which can be stored in the instruction buffer 63, n represents that there is one branch instruction in every n instructions, and $\lceil x/n \rceil$ represents the minimum integer greater than x/n.

Additionally, in the present embodiment, the number of recovery instructions which can be stored in the circular instruction buffers 60~62 is 6. However, the present invention is not limited thereto, and the number of recovery instructions which can be stored in the circular instruction buffers 60~62 can be determined according to the actual requirement. In the present embodiment, it is assumed that the instruction execution and processing circuit 20 can process at most 6 instructions. Thus, the number of recovery instructions which can be stored in each of the circular instruction buffers 60~62 is set to be 6. Namely, the number of recovery instructions which can be stored in the circular instruction buffers 60~62 is usually set to be the maximum number of instructions which can be processed by the back-end instruction execution and processing circuit.

When the cache controller 40 controls the instruction cache memory circuit 30 according to the target PC to fetch the instructions stored in the instruction cache memory circuit 30, the general instructions and the branch instructions are sent to the instruction buffer 63 to be stored therein. Herein the circular instruction buffers 60~62 sends a request to the cache controller 40, and the cache controller 40 sends the recovery instruction queue corresponding to the branch instructions from the instruction cache memory circuit 30 respectively to the circular instruction buffers 60~62, wherein the recovery instruction queue contains a plurality of recovery instructions. In addition, because the back-end instruction execution and processing circuit 20 is a deep-pipelining superscalar instruction executing circuit, three circular instruction buffers 60~62 are used for temporarily storing the recovery instructions in the present embodiment. Thus, when the branch mis-predication occurs, branch penalty in the CPU 100 using the recovery apparatus 10 can effectively reduced.

Next, when the branch instructions enter the decoding and pairing circuit 64, the corresponding recovery instructions enter the decoding and pairing circuit 64 as well. In this case, the decoding and pairing circuit 64 decodes and pairs the branch instructions and the recovery instructions simultaneously. After that, the decoding and pairing circuit 64 sets a mis-predication valid bit in each of the branch instructions to be 1 and at the same time, records a branch program counter inherited by the branch instruction. If the branch mis-predication does not occur, the decoding and pairing circuit 64 outputs the branch instructions to the back-end instruction execution and processing circuit 20. In addition, if it is the general instructions but not the branch instructions which enter the decoding and pairing circuit 64, the decoding and pairing circuit 64 receives only the general instructions and sends the general instructions to the back-end instruction execution and processing circuit 20 after decoding and pairing the general instructions.

When the branch mis-predication occurs, the entire pipeline of the instruction execution and processing circuit 20 and the instructions in the instruction buffer 63 are cleared. In this case, the decoding and pairing circuit 64 sends the recovery instructions corresponding to the branch instructions of the branch mis-predication to the instruction execution and processing circuit 20 so that the instruction execution and processing circuit 20 can execute the recovery instructions. Herein, since the recovery instructions exist in the pipeline of the instruction execution and processing circuit 20 and are executed continuously, the instruction buffer 63 can fetch new instructions during this period so as to reduce the performance penalty caused by stalling the pipeline of the instruction execution and processing circuit 20 and the decoding and pairing circuit 64 when the branch mis-predication occurs.

In addition, because the instructions are fetched from the instruction cache memory circuit 30 to the instruction buffer 63 and the circular instruction buffers 60~62 at the same time, the instruction cache memory circuit 30 can be designed along with a skew cache architecture. In this case, eight words can be read together from the instruction cache memory circuit 30 during each clock period. The branch prediction mechanism predicts that a branch is about to occur but eventually the branch does not occur in the situation of a conditional branch or a final loop. Thus, the load on the bandwidth of the instruction cache memory circuit 30 is not increased when the instruction cache memory circuit 30 adopts the skew cache design. However, foregoing design of the instruction cache memory circuit 30 along with the skew cache architecture is not intended for limiting the present invention; instead, this design is only adopted to not increase the load on the bandwidth of the instruction cache memory circuit 30.

Referring to FIG. 1 again, herein the instructions stored in the instruction buffer 63 will be used as an example, and it is assumed that a branch mis-predication occurs in a final loop or a conditional branch. As shown in FIG. 1, the instruction buffer 63 has 12 instructions, and these 12 instructions are respectively n−8, n−4, n (branch instruction), m−c, m−8, m−4, m (branch instruction), t−c, t−8, t−4, t (branch instruction), s, and s+4. The circular instruction buffer 62 stores 6 recovery instruction queues corresponding to the first branch instruction n, wherein the first recovery instruction is n+4, namely, the next instruction after the instruction n. On the other hand, the instruction m−c may be the branch target of the branch instruction n estimated by the BTB 50; namely, the branch target estimation mechanism estimates that the instruction m−c will be executed after the instruction n. Similarly, the circular instruction buffer 61 stores 6 recovery instruction queues corresponding to the second branch instruction m, wherein the first recovery instruction is m+4. The circular instruction buffer 60 stores 6 recovery instruction queues corresponding to the third branch instruction t, wherein the first recovery instruction is t+4, namely, the next instruction after the instruction t. The instruction s is the branch target of the branch instruction t estimated by the branch prediction mechanism.

Here it is assumed that the branch mis-predication occurs during the third branch instruction t. Thus, when the instructions n−8 and n−4 enter the decoding and pairing circuit 64, the decoding and pairing circuit 64 only decodes and pairs the instructions n−8 and n−4 and then sends the instructions n−8 and n−4 directly to the back-end instruction execution and processing circuit 20. After that, the first branch instruction n enters the decoding and pairing circuit 64, and meanwhile, the decoding and pairing circuit 64 also receives the recovery instruction n+4 from the circular instruction buffer 62. Because no branch mis-predication occurs, the decoding and pairing circuit 64 sends the instructions n, m−c, m−8, and m−4 to the instruction execution and processing circuit 20.

Next, when the second branch instruction n enters the decoding and pairing circuit 64, the decoding and pairing circuit 64 also receives the recovery instruction m+4 from the circular instruction buffer 61. Because no branch mis-predication occurs, the decoding and pairing circuit 64 sends the instructions m, t−c, t−8, and t−4 to the instruction execution and processing circuit 20.

When the third branch instruction t enters the decoding and pairing circuit 64, the decoding and pairing circuit 64 also receives the recovery instruction t+4 from the circular instruction buffer 60. Assuming that the instruction t will be branched to the next instruction t+4 instead of the instruction s estimated by the branch prediction mechanism, then because the branch mis-predication occurs, the decoding and pairing circuit 64 decodes and pairs the recovery instructions in the circular instruction buffer 60 and sends the recovery instructions to the instruction execution and processing circuit 20, so as to reduce the performance penalty caused by stalling the pipeline of the instruction execution and processing circuit 20 and the decoding and pairing circuit 64 when the branch mis-predication occurs. Such a situation always happens in recursive loops. For example, a specific loop can only end and proceed to the next instruction t+4 after recurring from the instruction t to the instruction s for several times. During the recursion of the loop, the branch prediction mechanism learns that "the instruction t will go to the instruction s" as the norm of branch prediction. However, after the loop completes and the program is to proceed from the instruction t to the next instruction t+4, the branch prediction will produce an error and which will cause hazard to the execution of the CPU. The present invention is intended to effectively recovering such a branch mis-predication problem.

Figure 2:
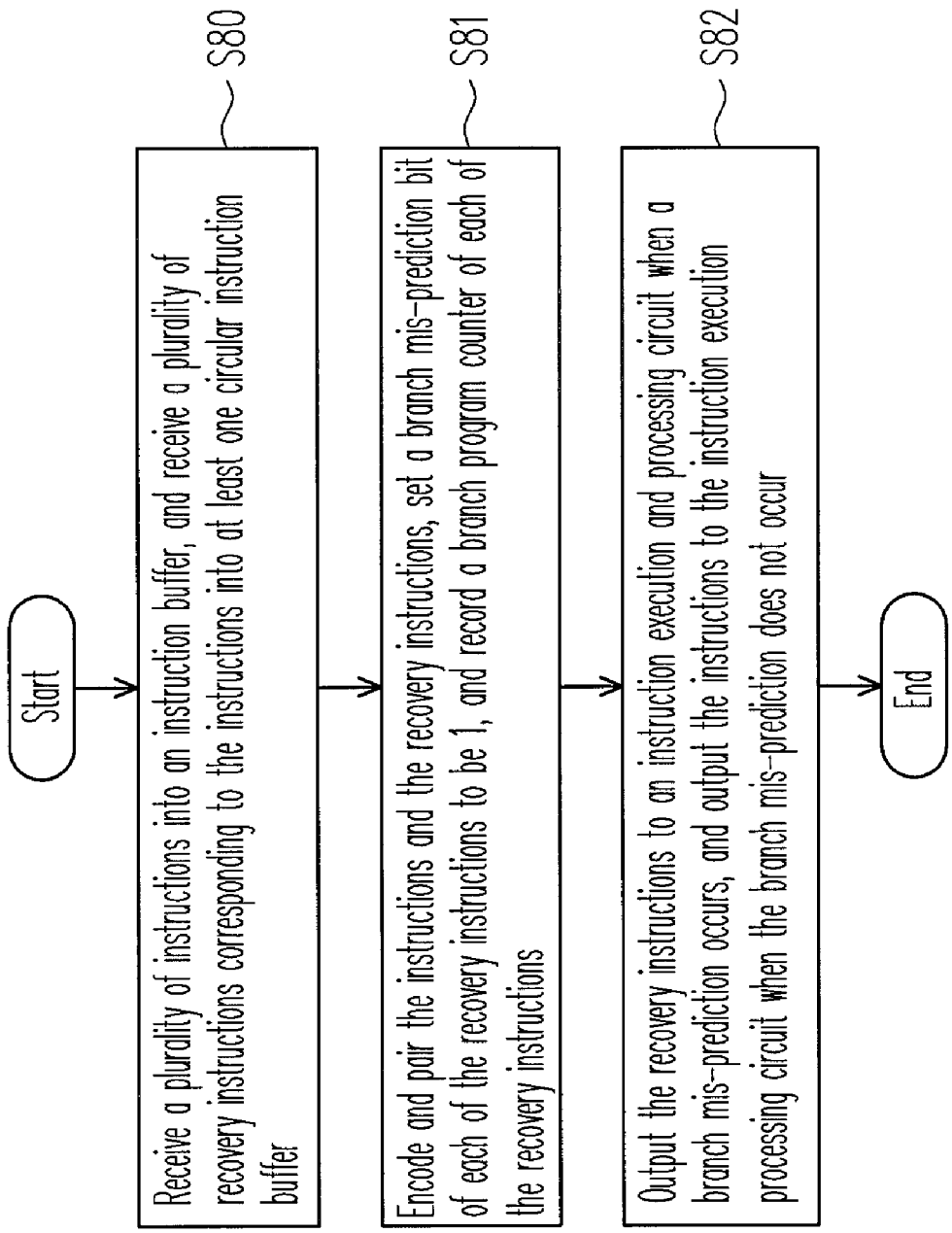
FIG. 2 is a flowchart of a recovery method for solving a branch mis-predication according to an embodiment of the present invention.

FIG. 2 is a flowchart of a recovery method for solving a branch mis-predication according to an embodiment of the present invention. This recovery method can be applied in a CPU, especially a deep-pipelining superscalar CPU. Referring to FIG. 2, first, in step S80, a plurality of instructions is received into an instruction buffer, and a plurality of recovery instructions corresponding to the instructions is received into at least one circular instruction buffer. Next, in step S81, the instructions and the recovery instructions are encoded and paired, and a branch mis-predication bit of each of the recovery instructions is set to be 1, and a branch program counter of each of the recovery instructions is recorded. Finally, in step S82, when a branch mis-predication occurs, the recovery instructions are output to an instruction execution and processing circuit; if the branch mis-predication does not occur, the instructions are output to the instruction execution and processing circuit.

As described above, the recovery apparatus and the method and the CPU thereof provided by the present invention are designed to reduce the performance penalty when a branch mis-predication occurs. Moreover, the recovery apparatus can be accomplished by simply disposing at least one circular instruction buffer in an original CPU architecture and several logic gates in an original decoding and pairing circuit. Thus, the recovery apparatus has low complexity and can be implemented easily. Furthermore, compared to a CPU without any instruction buffer, the performance of a CPU having the recovery apparatus is increased by about 9%~10% in a same 12-level pipeline architecture having a cache hit rate and a BTB hit rate at 95%.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A recovery apparatus for solving a branch mis-predication, the recovery apparatus comprising:
    an instruction buffer, for storing a plurality of instructions;
    at least one circular instruction buffer, for storing a recovery instruction queue corresponding to the instructions, wherein the recovery instruction queue comprises a plurality of recovery instructions; and
    a decoding and pairing circuit, coupled to the instruction buffer and the circular instruction buffer for decoding and pairing the instructions and the recovery instructions, wherein when the branch mis-predication occurs, the decoding and pairing circuit outputs the recovery instructions to an instruction execution and processing circuit connected to the decoding and pairing circuit externally.

2. The recovery apparatus according to claim 1, wherein the decoding and pairing circuit outputs the instructions to the instruction execution and processing circuit if the branch mis-predication does not occur.

3. The recovery apparatus according to claim 1, further comprising:
    a branch target buffer (BTB), for detecting whether a branch prediction occurs, wherein the BTB sends a target program counter (target PC) to a cache controller when the branch prediction occurs;
    the cache controller, coupled to the BTB, for controlling an instruction cache memory circuit according to the target PC to fetch the instructions and the recovery instructions stored in the instruction cache memory circuit; and
    the instruction cache memory circuit, coupled to the cache controller, the circular instruction buffer, and the instruction buffer, for storing the instructions and the recovery instructions.

4. The recovery apparatus according to claim 1, wherein a number of the recovery instructions which can be stored in the circular instruction buffer is equal to a number of the instructions which can be executed by the instruction execution and processing circuit.

5. The recovery apparatus according to claim 1, wherein the decoding and pairing circuit further sets a branch mis-predication bit of each of the recovery instructions to be 1 and records a branch program counter of each of the recovery instructions.

6. A recovery method for solving a branch mis-predication, the recovery method comprising:
    receiving a plurality of instructions into an instruction buffer memory, and receiving a plurality of recovery instructions corresponding to the instructions into at least one circular instruction buffer memory;
    encoding and pairing the instructions and the recovery instructions; and
    outputting the recovery instructions to an instruction execution and processing circuit when the branch mis-predication occurs.

7. The recovery method according to claim 6, further comprising:
   setting a branch mis-predication bit of each of the recovery instructions to be 1, and recording a branch program counter of each of the recovery instructions.

8. The recovery method according to claim 6, further comprising:
   outputting the instructions to the instruction execution and processing circuit if the branch mis-predication does not occur.

9. The recovery method according to claim 6, wherein a number of the recovery instructions which can be stored in the circular instruction buffer is equal to a number of the instructions which can be executed by the instruction execution and processing circuit.

10. A central processing unit (CPU) having a recovery apparatus, the CPU comprising:
   an instruction buffer, for storing a plurality of instructions;
   at least one circular instruction buffer, for storing a recovery instruction queue corresponding to the instructions, wherein the recovery instruction queue comprises a plurality of recovery instructions;
   a decoding and pairing circuit, coupled to the instruction buffer and the circular instruction buffer, for decoding and pairing the instructions and the recovery instructions, the decoding and pairing circuit outputting the recovery instructions to an instruction execution and processing circuit when a branch mis-predication occurs; and
   the instruction execution and processing circuit, coupled to the decoding and pairing circuit, for executing the recovery instructions and the instructions.

11. The CPU according to claim 10, wherein the decoding and pairing circuit outputs the instructions to the instruction execution and processing circuit if the branch mis-predication does not occur.

12. The CPU according to claim 10, further comprising:
   a BTB, for detecting whether a branch prediction occurs, the BTB sending a target PC to a cache controller when the branch prediction occurs;
   the cache controller, coupled to the BTB, for controlling a instruction cache memory circuit according to the target PC to fetch the instructions and the recovery instructions stored in the instruction cache memory circuit; and
   the instruction cache memory circuit, coupled to the cache controller, the circular instruction buffer, and the instruction buffer, for storing the instructions and the recovery instructions.

13. The CPU according to claim 10, wherein a number of the recovery instructions which can be stored in the circular instruction buffer is equal to a number of the instructions which can be executed by the instruction execution and processing circuit.

14. The CPU according to claim 10, wherein the decoding and pairing circuit further sets a branch mis-predication bit of each of the recovery instructions to be 1 and records a branch program counter of each of the recovery instructions.

* * * * *